(12) United States Patent
Scott et al.

(10) Patent No.: US 11,909,919 B2
(45) Date of Patent: Feb. 20, 2024

(54) COMMUNICATION ROUTING BASED ON USER CHARACTERISTICS AND BEHAVIOR

(71) Applicant: ZenPayroll, Inc., San Francisco, CA (US)

(72) Inventors: Brandon Anthony Scott, San Francisco, CA (US); Aurobind Ravichandran, San Francisco, CA (US); Matthew Surjana Oey, San Francisco, CA (US); Gregory Shunsuke Wilson, San Francisco, CA (US)

(73) Assignee: ZENPAYROLL, INC., San Francisco, CA (US)

( * ) Notice: Subject to any disclaimer, the term of this patent is extended or adjusted under 35 U.S.C. 154(b) by 0 days.

(21) Appl. No.: 17/981,478

(22) Filed: Nov. 7, 2022

(65) Prior Publication Data

US 2023/0057849 A1    Feb. 23, 2023

Related U.S. Application Data

(63) Continuation of application No. 17/572,479, filed on Jan. 10, 2022, which is a continuation of application
(Continued)

(51) Int. Cl.
*H04M 3/523* (2006.01)
*H04M 3/42* (2006.01)
(Continued)

(52) U.S. Cl.
CPC .......... *H04M 3/5235* (2013.01); *G06N 20/00* (2019.01); *H04M 3/42059* (2013.01);
(Continued)

(58) Field of Classification Search
CPC . H04M 3/5235; H04M 3/42059; G06N 20/00
(Continued)

(56) References Cited

U.S. PATENT DOCUMENTS 9,355,231 B2    5/2016    Disraeli
9,641,690 B2 *  5/2017    Ananthakrishnan .........
                                                H04M 3/5166
(Continued)

OTHER PUBLICATIONS

Lord, N., "What is User Activity Monitoring? How It Works, Benefits, Best Practices, and More," DATAINSIDER, Digital Guardian's Blog, Sep. 12, 2018, six pages, [Online] [Retrieved on Jun. 3, 2021], Retrieved from the Internet <URL: https://digitalguardian.com/blog/what-user-activity-monitoring-how-it-works-benefits-best-practices-and-more>.
(Continued)

*Primary Examiner* — Ahmad F. Matar
*Assistant Examiner* — Jirapon Tulop
(74) *Attorney, Agent, or Firm* — Fenwick & West LLP

(57) ABSTRACT

An enhanced routing system determines a service provider best suited to fulfill a user's request to interact and establishes a communication session between the user's client device and a device of the service provider. The enhanced routing system may use user characteristics and behavior to select the service provider. For example, the enhanced routing system receives a request to connect to a customer service system from a user who has recently started a new job and has been accessing a banking application on his mobile phone. The enhanced routing system may determine that a payroll service provider is best suited to fulfill the user's request. For example, the enhanced routing system uses a machine learning model that has been trained on previously fulfilled requests. In this way, the enhanced routing system improves upon systems that continuously
(Continued)

prompt the user for information by selecting a service provider without overburdening the user.

20 Claims, 6 Drawing Sheets

Related U.S. Application Data

No. 16/835,853, filed on Mar. 31, 2020, now Pat. No. 11,290,596.

(51) Int. Cl.
    *G06N 20/00*     (2019.01)
    *H04W 12/06*     (2021.01)

(52) U.S. Cl.
    CPC ...... *H04W 12/06* (2013.01); *H04M 2203/558* (2013.01); *H04M 2203/60* (2013.01)

(58) Field of Classification Search
    USPC .................................................. 379/265.13
    See application file for complete search history.

(56) References Cited

U.S. PATENT DOCUMENTS

| | | | | |
|---|---|---|---|---|
| 9,871,927 | B2* | 1/2018 | Perez | H04M 3/5235 |
| 10,298,759 | B1* | 5/2019 | Ross | H04M 3/5183 |
| 10,387,888 | B2* | 8/2019 | Sapoznik | G06F 16/9024 |
| 10,827,071 | B1 | 11/2020 | Adibi et al. | |
| 2002/0073208 | A1 | 6/2002 | Wilcock et al. | |
| 2008/0095049 | A1 | 4/2008 | Bugenhagen et al. | |
| 2012/0014282 | A1 | 1/2012 | Pappu et al. | |
| 2013/0160097 | A1 | 6/2013 | Dowlatkhah | |
| 2013/0173915 | A1 | 7/2013 | Haulund | |
| 2014/0365255 | A1 | 12/2014 | Burgess et al. | |
| 2015/0213372 | A1 | 7/2015 | Shah et al. | |
| 2018/0139328 | A1* | 5/2018 | Alford | H04M 3/5233 |

OTHER PUBLICATIONS

PCT International Search Report and Written Opinion, PCT Application No. PCT/US2021/023979, dated Jul. 12, 2021, 20 pages.

United States Office Action, U.S. Appl. No. 16/835,853, filed Jul. 21, 2021, 17 pages.

* cited by examiner

COMMUNICATION ROUTING BASED ON USER CHARACTERISTICS AND BEHAVIOR

CROSS REFERENCE TO RELATED APPLICATIONS

This application is a continuation of U.S. application Ser. No. 17/572,479, filed Jan. 10, 2022, now U.S. Pat. No. 11,539,843, which is a continuation of U.S. application Ser. No. 16/835,853, filed Mar. 31, 2020, now U.S. Pat. No. 11,290,596, which are incorporated by reference in their entirety.

TECHNICAL FIELD

This disclosure relates generally to a communication routing system, and more specifically to establishing a communication session based on user characteristics and behavior.

BACKGROUND

Various service providers may help businesses fulfill necessary roles in services such as human resources (HR), payroll, accounting, and information technology (IT). For service provider users (e.g., employees of these businesses), contacting the service providers may be a cumbersome process that involves an automated menu interface that the user must navigate to before resorting to requesting a human representative. Conventional systems that connect a user to a service provider attempt to route a user to the right service provider based on a series of questions or prompts (e.g., "Please say a phrase that best summarizes the reason for your call"). These systems fail to determine which service provider to connect a user to before a user has initiated a request to connect.

SUMMARY

An enhanced routing system establishes a communication session between a user and a service provider based on user characteristics and behavior. For example, the enhanced routing system accesses a user profile including user characteristics and a user's activity history on a client device that has logged the user's behavior to select a service provider that is most likely to best serve the user. The enhanced routing system may encode user characteristics and behavior to train and use a machine learning model to select a service provider best suited for the needs of the user. By automatically considering a user profile and activity history without needing the user to explicitly supply the information after the user requests to connect with a service provider, the enhanced routing system improves upon conventional systems by selecting a service provider without unnecessarily burdening the user.

The enhanced routing system can receive a request to interact with a customer service system. This request may be transmitted to the enhanced routing system from a client device of a user. For example, a user can request help on his mobile phone by dialing a primary customer service system phone number, and the enhanced routing system receives this request. The enhanced routing system may authenticate the client device to verify the identity of the user. For example, the enhanced routing system can generate an authentication code that it uses to verify the user's identity (e.g., the user must provide biometric identification to receive the generated authentication code). The enhanced routing system, after verifying the identity of the user, may determine one or more user characteristics or behaviors, including one or more of an activity history of the client device, a history of actions taken by the user (e.g., within an application, on a website/platform associated with the request), information associated with a user account, a user profile associated with the user, and the like. For example, the enhanced routing system determines software applications that the user has recently executed on their client device (e.g., a banking application) and identifies a user profile indicating that the user has recently started a new job. The enhanced routing system may select, based on the user profile and activity history, a service provider to whom to direct the received request. For example, the enhanced routing system can determine, using a machine learning model and encoded vectors representative of information from the activity history and user profile, to direct the received request to a payroll service provider. The enhanced routing system may establish a communication session between at least the client device and a device of the service provider to fulfill the request to interact. For example, the enhanced routing system initiates an instant messaging session between the mobile phone and a computer of the payroll service provider.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
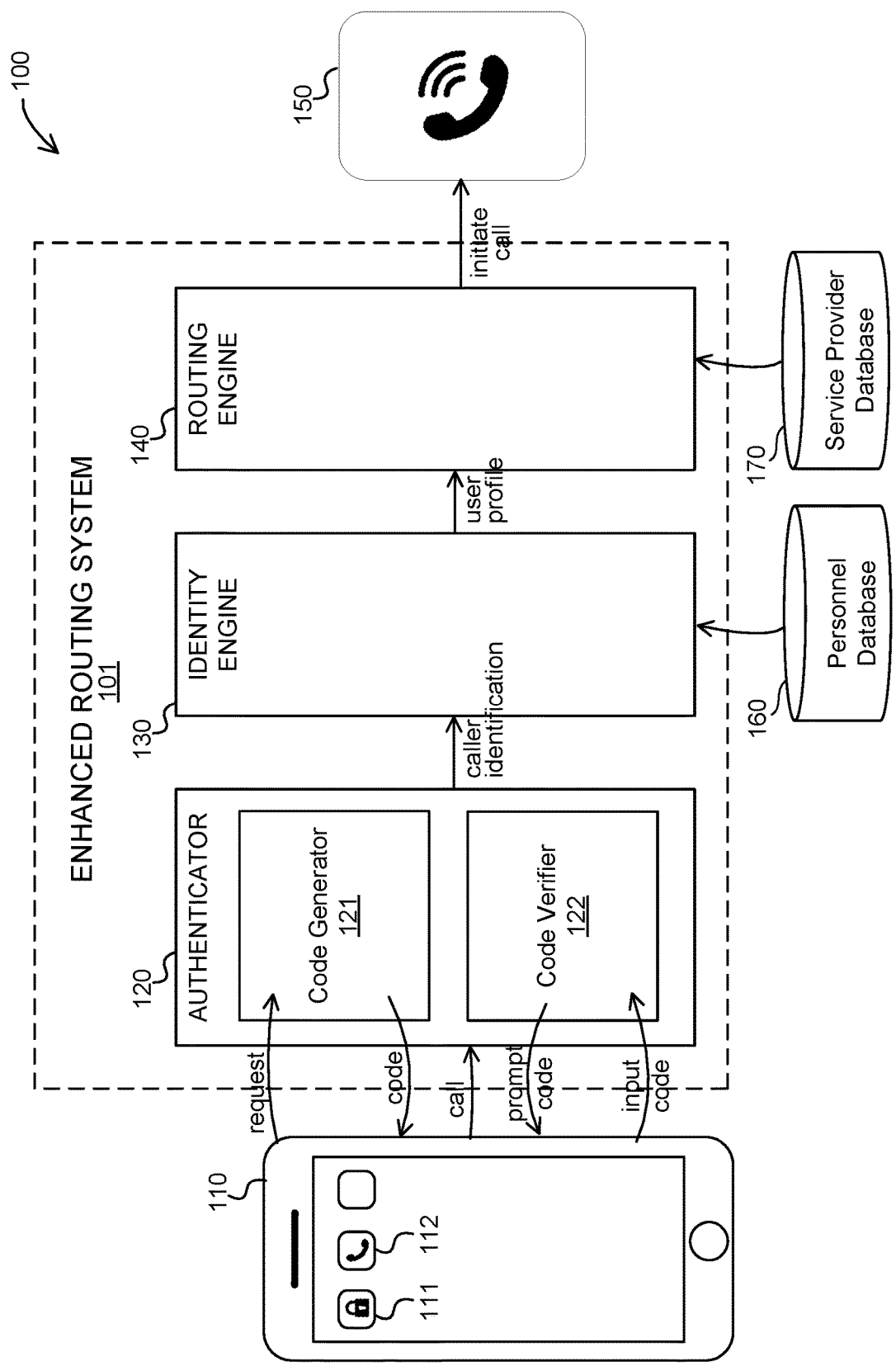
FIG. 1 is a block diagram of a system environment in which an enhanced routing system operates, in accordance with at least one embodiment.

FIG. 1 is a block diagram of a system environment 100 in which the enhanced routing system 101 operates. The system environment 100 shown by FIG. 1 includes the enhanced routing system 101, a client device 110, a service provider 150, a personnel database 160, and a service provider database 170. The system environment 100 may have alternative configurations than shown in FIG. 1, including for example different, fewer, or additional components. For example, although the personnel database 160 and the service provider database 170 are depicted as separate from the enhanced routing system 101, the personnel database 160 and the service provider database 170 may be stored on a server that is local to the server on which enhanced routing system operates.

Although not depicted, a network may serve to communicatively couple the client device 110, the enhanced routing system 101, the personnel database 160, the service provider database 170, and the service provider 150. The enhanced routing system 101 and the client device 110 are configured to communicate via the network, which may comprise any combination of local area and/or wide area networks, using wired and/or wireless communication systems. In some embodiments, the network uses standard communications technologies and/or protocols. For example, the network includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network include multiprotocol label switching (VIPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network may be encrypted using any suitable technique or techniques.

The client device 110 is a computing device capable of receiving user input as well as transmitting and/or receiving data via a network. In some embodiments, the client device 110 is a conventional computer system, such as a desktop or a laptop computer. Alternatively, the client device 110 may be a device having computer functionality, such as a personal digital assistant (PDA), a mobile telephone, a smartphone, or another suitable device. The client device 110 is configured to communicate with the enhanced routing system 101 via a network, for example using a native application executed by the client device 110 or through an application programming interface (API) running on a native operating system of the client device 110, such as IOS® or ANDROID™. In another example, the client device 110 is configured to communicate with the enhanced routing system 101 via an API running on the enhanced routing system 101. In some embodiments, software applications such as authentication application 111 and communication application 112 are stored and/or executed on the client device 110.

The enhanced routing system 101 establishes a communication session (i.e., fulfills a connection request to interact with a customer service system) between a client device and device of a service provider based on at least user characteristics and behavior. For example, the enhanced routing system 101 establishes a call between the client device 110 and the service provider 150 based on the location and computer activity of the user associated with the client device 110 (e.g., the user has provided security credentials to use the client device 110 or a software application executed on the client device 110). The enhanced routing system 101 includes various software modules such as an authenticator 120, an identity engine 130, and a routing engine 140. The various software modules allow the enhanced routing system 101 to verify the identity of a user associated with the client device 110, retrieve additional information about the verified user (e.g., retrieve a user profile from the personnel database 160), and establish a communication session between the client device 110 and device of a service provider that is most likely to best serve the user's needs (e.g., the service provider 150).

The service provider 150 selected by enhanced routing system may provide services such as accounting, information technology support, marketing, legal support, human resources, word processing, facility maintenance, health care benefits, recruiting, or any suitable service supporting a business's primary objective. In some embodiments, a service provider includes multiple groups of people which may be divided based on location, seniority, and/or role in providing the service. For example, a health care service provider can have subgroups of health care service providers based in particular states of the United States that specialize in the health care law of their respective state. In some embodiments, the enhanced routing system 101 may establish a communication session between a client device and multiple service providers. For example, although not depicted, the client device 110 may be connected to the service provider 150 and an additional service provider in a group chat session initialized in an application on the client device 110 (e.g., communication application 112 or an application that includes both functionality of authentication application 111 and communication application 112).

The authenticator 120 of the enhanced routing system 101 authenticates the client device 110 to verify the identity of the user associated with the client device 110. The authenticator 120 includes a code generator 121 and a code verifier 122. The authenticator 120 may verify a user identification such that the enhanced routing system 101 may determine an activity history associated with the verified user and a user profile from a personnel database (e.g., using the identity engine 130). In some embodiments, the authenticator 120 performs an authentication procedure using both an authentication code and an additional security credential to verify a user identity (e.g., a two-step or two-factor authentication). For example, the enhanced routing system 101 receives, from a first application on the client device 110 (e.g., communication application 112), a request for a communication session and/or authentication code at the authenticator 120. The authenticator 120 may then provide an authentication code to a second application on the client device 110 (e.g., authentication application 111). Authentication application 111 may verify a user by requesting security credentials (e.g., requesting a password or biometric identification) before the authentication code is accessible. The authenticator 120 verifies a user after receiving the generated authentication code from the client device 110 (e.g., through communication application 112). In this manner, the authenticator 120 may use both the authentication code and additional security credentials (i.e., to access the authentication code) to verify a user identity. In some embodiments, authentication application 111 and communication application 112 belong to a common application rather than existing as two separate applications. For example, an enhanced routing application is accessible to the user of the client device 110 that has a user interface for authentication with the authenticator 120 and another interface for communication to the service provider 150. In this example, a user can use a single enhanced routing application to request to speak to a service provider representative (e.g., selecting a button to speak to a representative) and the enhanced routing application will automatically switch between authentication and/or communication interfaces to fulfill the user's request as described herein. The authenticator 120 may transmit and receive authentication codes using Wi-Fi, short messaging service (SMS), voice over IP (VOIP), or any suitable communication service enabled by a network (e.g., network 110).

In some embodiments, the authenticator 120 determines whether the client device 110 is permitted to use the enhanced routing system 101 using an identification number associated with the client device 110. For example, the authenticator 120 determines whether a media access control (MAC) address associated with the client device 110 transmitting the request to establish a communication session with a service provider is MAC address that is not permitted to use the enhanced routing system 101. In response to determining that the client device is not permitted to use the enhanced routing system 101, the authenticator 120 may cause the enhanced routing system 101 to disconnect from the client device 110 (e.g., to generate a webpage notifying the user that he does not have permission to access the enhanced routing system 101). In some embodiments, the authenticator 120 may compare identification numbers such as phone numbers, IP addresses used by client devices to access the enhanced routing system 101, and/or MAC addresses of client devices to corresponding identification numbers that are registered as not permitted to use the enhanced routing system 101.

The authenticator 120 may determine whether the client device 110 is pre-authenticated or pre-approved to use the enhanced routing system 101. In some embodiments, the enhanced routing system 101 maintains a list of identification numbers associated with client devices that are automatically granted access to the enhanced routing system 101 and not required to perform a user verification through the code generator 121 and the code verifier 122. For example, the enhanced routing system 101 maintains a list of phone numbers and determines, based on the list and the phone number used to request a communication session through the enhanced routing system 101, that the client device is pre-authenticated. The enhanced routing system 101, responsive to determining that the client device is pre-authenticated, routes the authenticated user's identity to the identity engine 130 to retrieve information about the pre-authenticated user. The authenticator 120 may associate a generated authentication code with the identification number of the client device 110 (e.g., a phone number or MAC address of a client device used to contact the enhanced routing system 101) and store the association in a database such that it may be used by components of the enhanced routing system 101 (e.g., the identity engine 130).

The code generator 121 generates an authentication code to be verified by the code verifier 122. In some embodiments, the code generator 121 generates an authentication code randomly or substantially randomly. For example, a pseudo-random number generator may be used at the code generator 121 to generator the authentication code. In some embodiments, the code generator 121 generates an authentication code in a deterministic manner. For example, the code generator 121 encodes the current time in the generated authentication code. The encoded time may be used to determine that the authentication code generated by the code generator 121 has expired and is no longer valid to verify the identity of the user associated with the client device 110. In some embodiments, the code generator 121 encodes a number in the authentication code deterministic of the number of requests for a code that the client device has requested since a previous, successful code verification attempt.

As depicted in FIG. 1, the code generator 121 receives a request for an authentication code from the client device 110 (e.g., from authentication application 111). After the code generator 121 has generated the authentication code, the code generator 121 may cause the authentication code to be transmitted to the client device 110 (e.g., to authentication application 111). Although not depicted, there are additional ways in which the code generator 121 may generate a code for verifying the identity of the user associated with the client device 110. In some embodiments, the code generator 121 receives a request for an authentication code from a first application on a client device and transmits the generated code to a second application, different from the first application, on the client device. For example, the code generator 121 receives a request generated by authentication application 111 and transmits the generated code to communication application 112. In some embodiments, the code generator 121 receives a request for an authentication code from an application on a first client device associated with a user and transmits the generated code to the application on a second client device associated with the user. For example, code generator receives a request from a security application on a mobile phone and transmits the generated code to the security application on a laptop.

The code verifier 122 verifies that the authentication code received from the client device 110 is the authentication code generated by the code generator 121, thereby verifying a user associated with the client device 110. In some embodiments, the code verifier 122 compares the code received from the client device 110 to the authentication code generated by the code generator 121. For example, the code verifier 122 may compare two numeric codes for an exact match. In some embodiments, the code verifier 122 decodes received authentication codes to determine whether the code is valid to use for identity verification. For example, the code verifier 122 decodes the authentication code to determine that the authentication code was generated by the code generator 121 an hour ago, surpassing a threshold time of thirty minutes that the authentication code was to be valid for. The code verifier 122 may then determine that the authentication code, though correct, is not valid to use for identity verification. In some embodiments, the code verifier 122 transmits a prompt to the client device 110 with information regarding the verification process. For example, the code generator 121 encodes the authentication code such that it is indicative that this is the fourth code the user has requested since the last successful verification, and the code verifier 122 may transmit a prompt to the client device 110 indicating that the user has one last try before verification attempts will be suspended for a predetermined amount of time.

As depicted in FIG. 1, the code verifier 122 receives a call from the client device 110 (e.g., from communication application 112) to establish a communication session with a service provider. In response to receiving the request, the code verifier 122 prompts the client device 110 with a request for the authentication code generated by the code generator 121. The code verifier 122 may receive the code from the client device 110 (e.g., the user has entered a numeric authentication code through a dial pad display) to verify the user. Although not depicted, there are additional ways in which the code verifier 122 may verify a code to verifying the identity of the user associated with the client device 110. In some embodiments, a communication session is initiated between the client device 110 and enhanced routing system 110 (e.g., prior to the code generator 121 generating an authentication code) to request a communication session between the client device 110 and device of a service provider. The enhanced routing system 101 may maintain the communication session while the code generator 121 and the code verifier 122 verify the identity of the user associated with the client device 110. That is, the user may not need to initiate a second communication session with the enhanced routing system 101 for the code verifier 122 to prompt the client device 110 for the authentication code. The code verifier 122 may prompt for the client device 110 for the generated authentication code after a predetermined time that the code generator 121 generated the authentication code. For example, the code verifier 122 automatically prompts the client device 110 (e.g., through an automated voice message over communication application 112) five seconds after the code generator 121 generates the code and receives an acknowledgement from the client device 110 indicative that the authentication code was received by the client device 110. In some embodiments, an additional client device accessible by the user of the client device 110 may be used to authenticate the user's identity. For example, the code generator 121 may transmit (e.g., through SMS) an authentication code to an additional client device that is recognized by the authenticator 120 as belonging to the user (i.e., the additional client device is already verified), and code verifier can verify the client device 110 after receiving the transmitted code from the client device 110.

The identity engine 130 identifies a user profile associated with a user and determines the activity history of the client device associated with the user. For example, the identity engine 130 identifies a user profile including personal data of the user associated with the client device 110 and determines a recent history of instructions executed by the client device 110 (e.g., Internet browsing history within ten minutes of verifying the user's identity). In some embodiments, the identity engine 130 retrieves user profile data from the personnel database 160. For example, the identity engine 130 uses the phone number of the client device 110 from caller identification (e.g., provided by the authenticator 120) to retrieve a user profile stored in the personnel database 160 by matching the phone number from the authenticator 120 to the phone number in the user profile. In some embodiments, the identity engine 130 retrieves activity history associated with a user such as a user's activity within an application, the content that the user has viewed within the application (e.g., images, videos, reports, or articles). The activity history retrieved may be aggregated from multiple client devices accessed by the user to browse an application (e.g., a social media application or an enhanced routing application as described herein).

The stored data in the personnel database 160 includes personnel data for individuals belonging to an organization associated with the enhanced routing system 101. The personnel data may include information on each of the individuals, such as biographic and demographic information, according to some embodiments. The information may include historical information on the individual, as well as information regarding the relationship between the individual and an organization. For example, the personnel database 160 may include a hiring date of an employee at a company. In some embodiments, the information for an individual includes sensitive information that is restricted, such that only authorized users of the enhanced routing system 101 or users with particular access permissions may access and/or modify the sensitive information, in the personnel database 160. Various types of data may be stored in the personnel database 160. For example, data may include financial transaction data, personally identifiable information ("PIT"), healthcare records, user data (for instance, describing a user's actions or communications within a network), social media data, sensor data, and the like. Some or all of the data stored in the personnel database 160 may be sensitive information, such as social security numbers, phone numbers, full names of individuals, and/or addresses of individuals.

The routing engine 140 selects, based on the user profile and activity history received from the identity engine 130, a service provider to whom to direct the received communication session request. For example, the routing engine 140 determines to direct the received communication session request to a payroll service provider based on user profile data indicating that direct deposits of paychecks have ceased and activity history indicating that the user executed a banking application on his client device. In some embodiments, the routing engine 140 retrieves service provider data from the service provider database 170. For example, the routing engine 140 selects a payroll service that is likely to best serve the user and identifies, from service provider information in the service provider database 170, contact information for the payroll service. In some embodiments, the routing engine 140 establishes a communication session between at least the client device and a device of a service provider to fulfill the request to interact. For example, routine engine 140 establishes a call between the client device 110 and a phone associated with the service provider 150. The routing engine 140, in some embodiments, determines that multiple service providers best serve a user's request and establishes a communication session between the client device and the multiple service providers. For example, the routing engine 140 establishes a conference call including the client device 110, a payroll service provider (e.g., the service provider 150), and, although not depicted in FIG. 1, an HR service provider. The routing engine 140 is described in further detail in the description of FIG. 2.

In some embodiments, the enhanced routing system 101 requests a communication session be established between the client device 110 and the service provider 150 (i.e., without the client device 110 requesting to connect with a service provider). For example, the enhanced routing system 101 monitors a user's actions on the client device 110 (e.g., webpages viewed). The enhanced routing system 101 may determine to request a communication session on behalf of the client device 110 in anticipation that the user of the client device 110 is likely to need assistance provided through the communication session. For example, the enhanced routing system 101 monitors user actions, including the creation of an expense report and search queries for "abnormal expenses," and uses a machine learning model to determine that the combination of user actions is correlated to an accounting service provider. Subsequent to this determination, the enhanced routing system 101 may transmit a notification to client device 101 prompting the user to accept a communication session invitation with a service provider that the enhanced routing system 101 has transmitted a request to, inviting the service provider device to join a communication session.

Routing Engine

Figure 2:
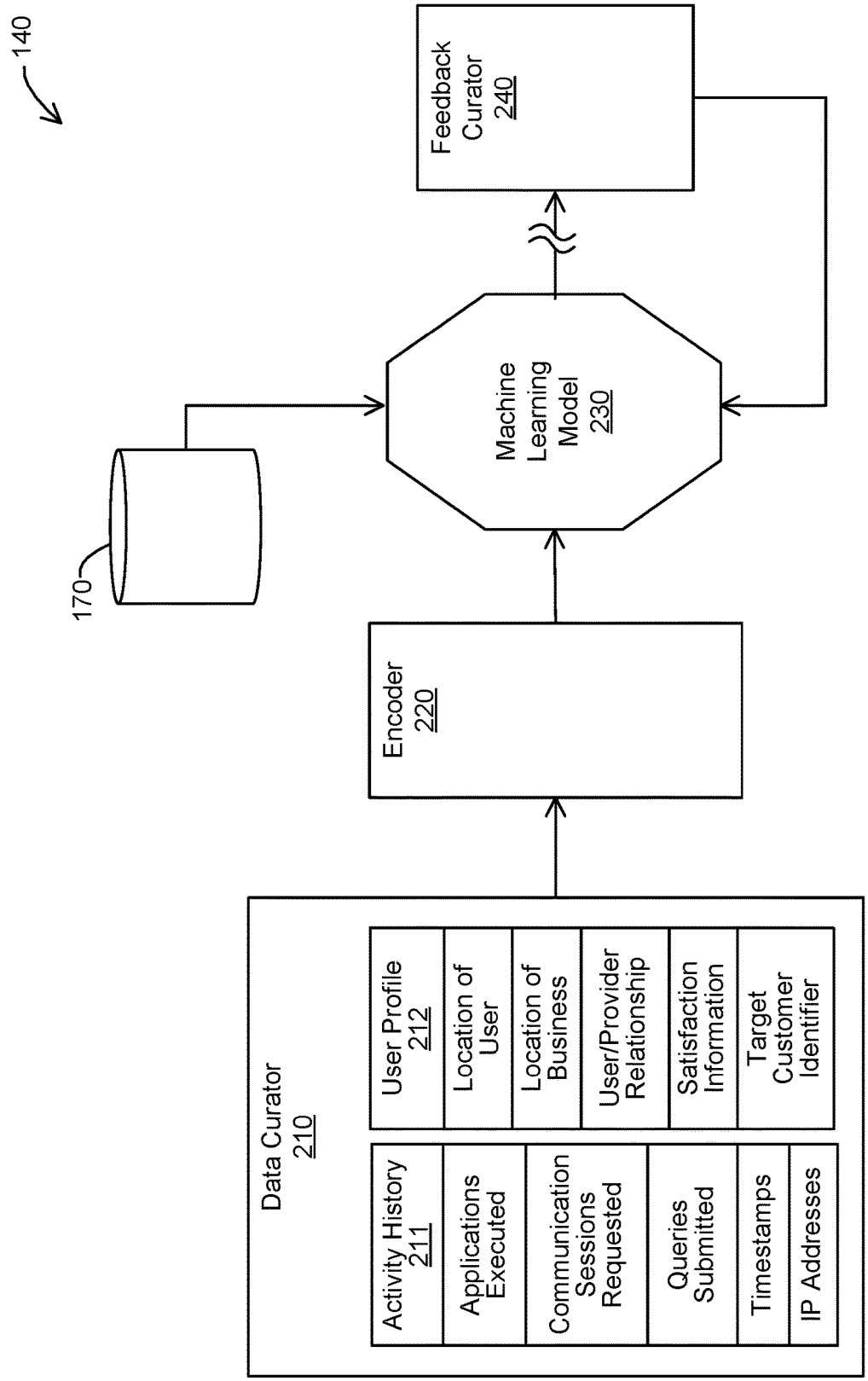
FIG. 2 is a block diagram of a routing engine of the enhanced routing system of FIG. 1, in accordance with at least one embodiment.

FIG. 2 is a block diagram of the routing engine 140 of the enhanced routing system 101 of FIG. 1. The routing engine 140 includes a data curator 210, an encoder 220, a machine learning model 230, and a feedback curator 240. In some embodiments, the routing engine 140 accesses the service provider database 170 to train the machine learning model 230 and/or input service provider data stored in the service provider database 170 to select a service provider most likely to best serve a user. The routing engine 140 may have alternative configurations than shown in FIG. 2, including different, fewer, or additional components. For example, although the data curator 210 is shown as outputting data to the encoder 220, the encoder 220 may receive data (e.g., activity history and user profile data) from another component of the enhanced routing system 101 (e.g., the identity engine 130).

The data curator 210 assembles data such as activity history and user profile data for encoding by the encoder 220. Although not depicted, the data curator 210 may receive user profile and activity history from the identity engine 130 of the enhanced routing system 101. In some embodiments, the data curator 210 selects a subset of data available to provide to the encoder 220. For example, the data curator 210 may select the recent queries submitted by the user in an activity history 211 and the location of the user listed in a user profile 212 to provide to the encoder 220. In some embodiments, the data curator 210 uses a time threshold to limit the amount of data to assemble. For example, the data curator 210 can implement a time threshold of one hour, and that the data representative of a user's activity history relevant for establishing a communication session is limited to data describing activity that occurred in that past hour.

The data organized under the activity history 211 includes the applications executed by the client device, the communication sessions requested, queries submitted, user actions in the executed applications, and applications and/or webpages viewed by the user. Applications executed by the client device may include a list of software applications executed by a client device associated with the user and/or software applications executed by a remote server at the instruction of the client device associated with the user. Communication sessions requested may include a record of the number of communication sessions requested, timestamps at which the requests were made, and/or the participants in the communication sessions (e.g., which service provider was connected with the client device in the communication session). Queries submitted may include a list of queries submitted by the user to a search engine. The data curator 210 may maintain a record of how the queries were submitted (e.g., by voice through a speech-to-text engine or by textual input through a keyboard) and the search engine used (e.g., a search interface on an HR application for a mobile operating system). User actions in the executed applications may include content requested or methods used to request the content. For example, user actions indicate that a user requested an expense report from the application and requested the report without spending a substantial amount of time performing other actions in the application before requesting the expense report (e.g., by monitoring the time spent on a particular interface of an application or the scrolling speed of a user before requesting the expense report). Applications and/or webpages viewed may include a list of applications the user viewed regardless of accessing or a browsing history of an Internet browser. For example, webpage markup language may be parsed to determine any executable applications that the user viewed but did not execute (e.g., the webpage a user visited had an option to access an accounting service, but the user did not click it).

The data organized under the user profile 212 includes the location of a user, location of a business, information about a relationship between a user and a service provider (e.g., customer relationship management information), satisfaction information, and a target customer identifier. Location of a user may include a current location of a user that is periodically updated to the user profile and/or a location that the user inputs to his user profile. Location of a business may include a current location of a business (e.g., a mobile business such as a food truck) and/or a location that the user inputs to his user profile indicating where the business resides or location that it is incorporated in. For example, a user employed at a business inputs that his business is in San Francisco, California Information about a relationship between a user and a service provider may include a time duration of which the user has been served by the service provider. For example, a user has worked with an HR service provider for six months. Information about a relationship between a user and a service provider may include whether or not a user has an existing service account with the service provider. For example, a user has an account with an HR service provider. Satisfaction information may include feedback given by the user regarding the communication sessions requested. For example, although not depicted in FIG. 2, the feedback curator 240 may output satisfaction information to the data curator 210. A target customer identifier may include an indication that the user is somebody who a service or product is best suited for. For example, the target customer identifier indicates that an HR service provider is best suited for the user. The user profile 212 may also include, although not depicted, user demographic information such as a user's age, gender, job title, a place of employment where the user has the job title, or any suitable information characterizing a user that may be relevant for selecting a service provider to connect the user to.

Encoder 220 generates a mathematical representation of data from the data curator 210 for input to the machine learning model 230. In some embodiments, the encoder 220 generates a vector, where the values of the vector correspond to quantified representations of data from the data curator 210 (e.g., location of a user represented by a real number). The dimensions of the mathematical representations generated by the encoder 220 may be determined by the data curator 210. For example, a user profile without any information regarding the location of the user or a location of a business may cause data curator to provide less information to the encoder 220 than provided for a user profile having such location information. The encoder 220, in turn, may generate a mathematical representation that is of a smaller dimension (e.g., a smaller vector) for input to the machine learning model 230. In some embodiments, the encoder 220 generates a vector of values associated with a user based on data from the data curator 210. The encoder 220 may generate a vector of values associated with a service provider based on information from the service provider database 170. Although not depicted, service provider 170 may be accessible to the encoder 220 to generate the second vector. The vector associated with a user may include values representative of a user's activity and profile, and the vector associated with a service provider may include values representative of a service provider's services.

The machine learning model 230 selects a service provider that is most likely to best serve the user's needs. The machine learning model 230 receives input from the encoder 220, the service provider database 170, the feedback curator 240, or any combination thereof. For example, the machine learning model 230 receives an encoded vector from the encoder 220 and feedback from the feedback curator 240 to predict a service provider in the service provider database 170 that is most likely to best serve the user's needs. In some embodiments, the machine learning model 230 receives, from the encoder 220, a vector of values associated with a user based on data from the data curator 210 and vectors of values associated with respective service providers. The machine learning model 230 may calculate dot products between the vector of values associated with the user and respective vectors of values associated with the respective service providers. The machine learning model 230 may compare the calculated dot products to determine the vector associated with the service provider that was used to calculate the largest dot product (e.g., the dot product indicative of a best match between a user and a service provider). In some embodiments, the machine learning model 230 receives, as an input, information characterizing a user (e.g., activity history and user profile) and outputs a service provider that is highly correlated with the characterizing information. For example, for a Chief Financial Officer (CFO) working in San Francisco, the machine learning model 230 receives his job title and location of employment with his user profile information and outputs an accounting service provider located in California because the service provider familiar with the accounting profession in California is highly correlated with the characterizing information (e.g., based on training the machine learning model 230 from positive reviews from previous communication sessions).

In some embodiments, the machine learning model 230 includes a machine learning training engine that trains the machine learning model 230 using training sets curated by the feedback curator 240. For example, the feedback curator 240 receives, from the client device 110, user feedback indicating that the user is highly satisfied with the communication session established using the enhanced routing system 101 and creates a training set including the encoded data generated by the encoder 220 and the service provider selected by the machine learning model 230. The training set may then be used by the machine learning training engine to re-train the machine learning model 230, which can be trained on data representative of previous interactions with the enhanced routing system 101 by users who have or are using the system and their respective profiles and/or activity histories. Machine learning training engine may re-train the machine learning model 230 to either strengthen or weaken associations between a selected service provider and information characterizing a user such as a user profile and/or activity history. For example, the machine learning training engine may strengthen an association between a selected accounting service provider and a user profile characterized by a job title of "Chief Financial Officer" in response to receiving a 4 out of 5-star review of the communication session from the corresponding user (e.g., receiving a positive measure of satisfaction). As another example, the machine learning training engine may weaken an association between a selected human resources provider and the user profile characterized by the "Chief Financial Officer" job title in response to receiving a 1 out of 5-star review of the communication session with the HR provider from the CFO (e.g., receiving a negative measure of satisfaction). In some embodiments, the machine learning training engine uses communication sessions that have been manually established by the user, without the use of the enhanced routing system 101, to train the machine learning model 230. For example, the user feedback received of a communication session that a user established by answering prompts from a routing system (e.g., "Please say in a short phrase what you are calling about") is used in combination with the user's user profile information and activity history to train the machine learning model 230. In some embodiments, the machine learning model 230 attributes weights values within training sets or feature vectors. For example, the machine learning model 230 may determine that increasing the weight of values representing data in the activity history 211 over the weight of values representing data in the user profile 212 minimizes the number of unsuccessful communication sessions (e.g., using user feedback curated by the feedback curator 240), and adjusts the weights accordingly.

The machine learning model 230 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, a supervised or unsupervised learning algorithm, or any suitable combination thereof.

In some embodiments, although not shown in FIG. 2, the routing engine 140 includes a communication session engine that establishes a communication session between the client device 110 and a device of the service provider selected by the machine learning model 230. For example, a communication session engine may initiate, maintain, and/or terminate a communication session over IP (e.g., an instant messaging session or a mobile phone call over a 4G Long-Term Evolution protocol).

The feedback curator 240 assembles feedback data based on user input and the established communication session. In some embodiments, the feedback curator 240 receives an indication of the degree to which a user was satisfied with the communication session established by the enhanced routing system 101 (such as a satisfaction with the appropriateness of the selected service provider to whom the communication session was routed). For example, the feedback curator 240 receives a star rating quantifying how satisfied a user was (e.g., five out of five stars indicating maximum satisfaction). The feedback curator 240 may generate a data structure interpretable by the machine learning model 230, where the data structure correlates the received satisfaction indication and the communication session it is directed to. For example, the data structure may include an indication of 100% satisfaction from the 5-star rating, list of participants in the communication session (e.g., the user and the service provider), duration of the communication session, and time at which the communication session occurred. This data structure may be used to generate a training set for the machine learning model 230 to minimize the likelihood of incorrectly predicting a service provider that best serves a user. Although not shown, the data structure may be sent to other components of the routing engine 140. For example, the feedback information in the data structure may be sent to the data curator 210 to be maintained in the user profile 212 of the data curator 210.

Routing Interface

Figure 3A:
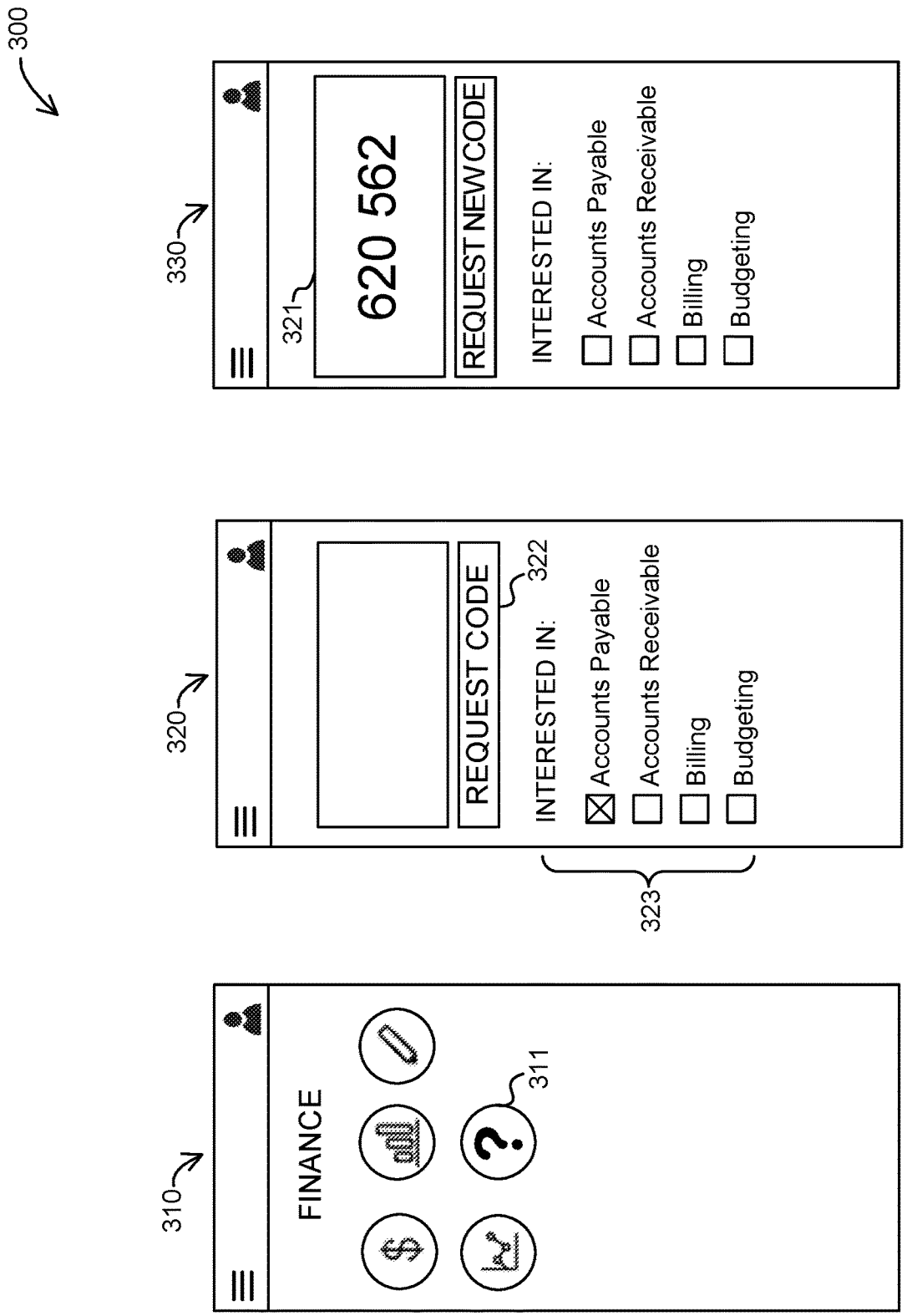
FIGS. 3A-3B depict a process for establishing a communication session through illustrative graphical user interfaces (GUI) of an enhanced routing system, in accordance with at least one embodiment.
Figure 3B:
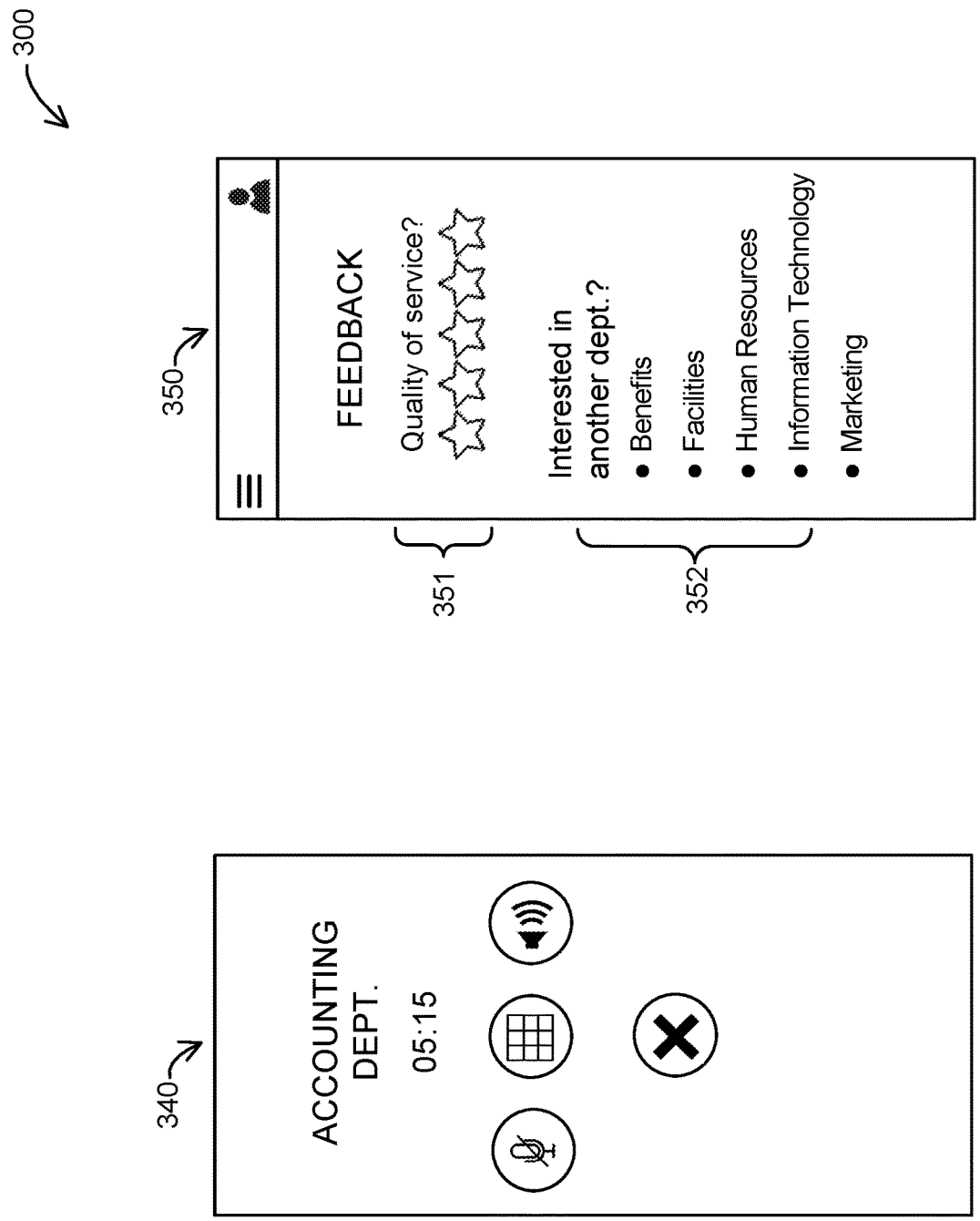

FIGS. 3A-3B depict process 300 for establishing a communication session through illustrative graphical user interfaces (GUI) 310, 320, 330, 340, and 350 of the enhanced routing system 101 of FIG. 1. The GUIs 310, 320 and 330 depict a request for a communication session and a verification of a user identity. The GUIs 340 and 350 depict an established communication session and an input for feedback regarding the communication session.

The GUI 310 depicts a menu for service options related to a user's finance. A business that a user (e.g., a Chief Financial Officer) is employed at may provide the user with access to the business's finance records through a mobile application. The mobile application includes service options for accessing the business's current funds, reviewing a history of expenses, making payments, analyzing projected profits, and help option 311. A user may select help option 311 to request a communication session established by the enhanced routing system 101.

The GUI 320 depicts an authentication menu for generating an authentication code (e.g. using the code generator 121 of the authenticator 120). A user may request an authentication code provided by the code generator 121 using a button 322. In some embodiments, the user may provide the enhanced routing system 101 with information regarding his intention for the communication session. For example, a menu 323 provides options for a user to select topics he is interested in discussing. As depicted, the user has selected "Accounts Payable," indicating he wants to discuss accounts payable over the communication session. This indication may be received by the enhanced routing system 101 and included in the activity history 211 such that the machine learning model 230 may use the "Accounts Payable" indication to select a service provider for the communication session. It should be noted that in some embodiments, a user is not required to indicate a topic of interest, further reducing the burden on the user in the routing of the user's request for a communication session to an appropriate service provider.

The GUI 330 depicts a generated authentication code on the authentication menu in the GUI 320. Authentication code "620562" has been generated in a window 321 for the user to input when prompted by the enhanced routing system 101 (e.g., using the code verifier 122). In some embodiments, a user may request another code with different interests selected from the menu 323. For example, the user has decided that, in addition to accounts payable, he is interested in discussing budgeting. The user may select both boxes and request a new code.

Although not shown, the enhanced routing system 101 may prompt the user for additional security to access the generated authentication code. For example, the enhanced routing system 101 may cause the code to not be displayed until the user has provided biometric identification through the client device displaying the GUI 330. Additionally, although not shown, the enhanced routing system 101 may prompt the user to input the authentication code for the code verifier 122 to verify the identity of the user. For example, the enhanced routing system 101 generates an automated voice call to the user asking for the authentication code to be entered on a dial pad. In another example, the enhanced routing system 101 transmits an SMS to the client device 110 prompting the user to provide the authentication code, which the user of the client device 110 may provide through SMS in response. Once the user identification has been verified, the enhanced routing system 101 may provide an identification number associated with a client device of the user (e.g., the phone number of the mobile phone displaying the GUI 340) to the identity engine 130. The identity engine 130 may determine a user profile from personnel database 130 to provide to the routing engine 140. The routing engine 140 may then select a service provider that is likely to best serve the user. For example, the routing engine 140 determines, based on the user's interest in accounts payable, that the user is interested in an accounting service provider. The routing engine 140 may initiate a communication session with the client device of the user and the accounting service provider.

The GUI 340 depicts a communication session in progress. The enhanced routing system 101 has established a communication session between the client device displaying the GUI 340 and a device of an accounting service provider.

The GUI 350 depicts an input for feedback regarding the communication session established by the enhanced routing system 101. In some embodiments, the GUI 350 includes a rating menu 351 and a supplemental service menu 352. The user may indicate a degree to which he was satisfied with the call through the rating menu 351. For example, the user selects one out of five stars to indicate minimum satisfaction. The user may indicate a supplemental service provider that he is interested in. For example, the dissatisfied user may select the HR service provider. The enhanced routing system 101 may receive the user's indication of the supplemental service provider he is interested in. In response, the enhanced routing system 101 may establish a communication session with the client device and the supplemental service provider. For example, the enhanced routing system 101 may establish a communication session with the client device and the HR service provider. In some embodiments, the feedback curator 240 of the enhanced routing system 101 may provide the indication of the supplemental service to the machine learning model 230 to train the machine learning model 230 to suggest the accounting service provider with less likelihood for the user associated with respective activity history and user profile.

Processes for Establishing a Communication Session

Figure 4:
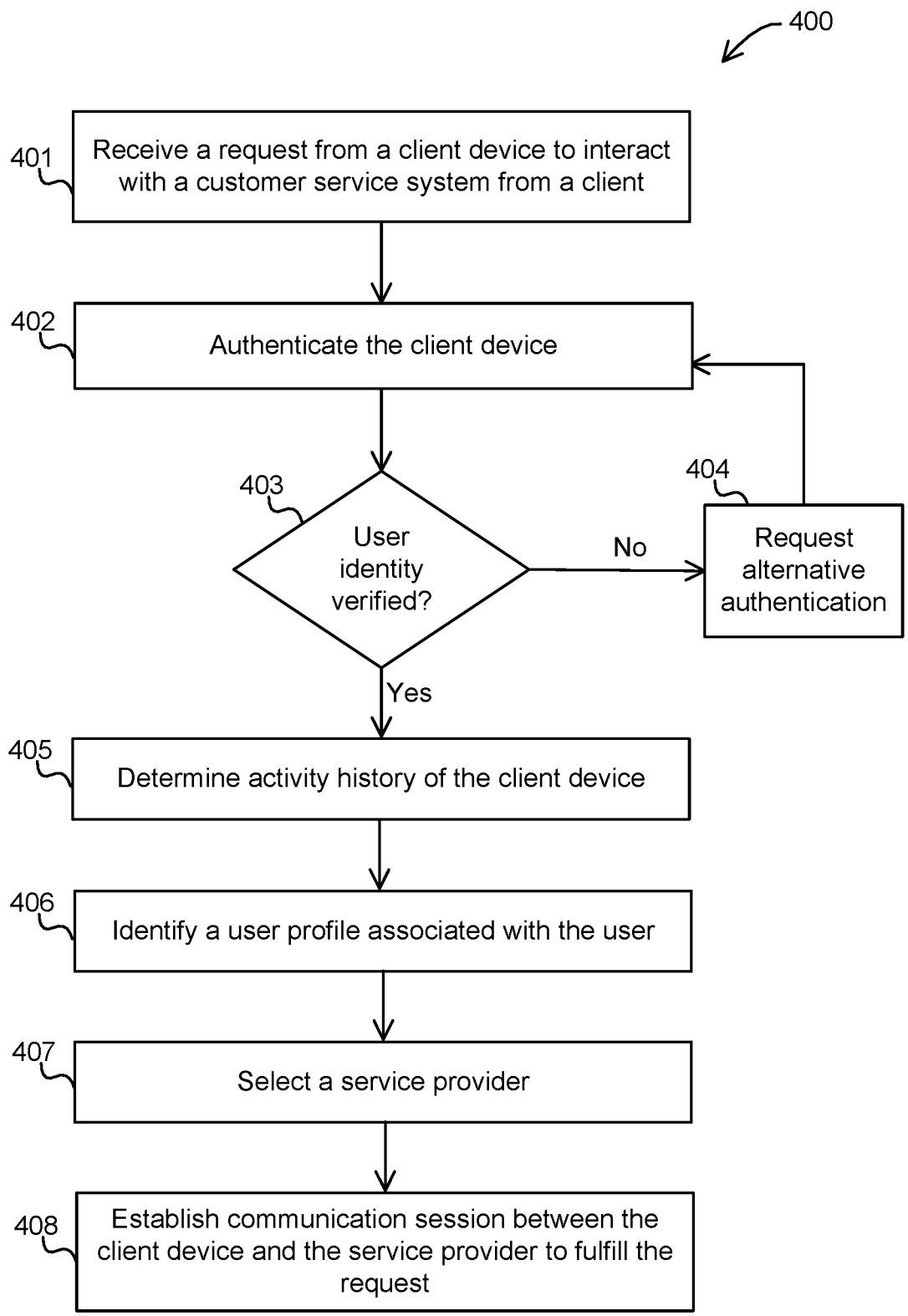
FIG. 4 is a flowchart illustrating a process for establishing a communication session using the enhanced routing system, in accordance with at least one embodiment.

FIG. 4 is a flowchart illustrating a process 400 for establishing a communication session using the enhanced routing system. The process 400 may be performed by the enhanced routing system 101.

The enhanced routing system 101 receives 401 a request from a client device to interact with customer service. For example, a client device transmits a request to establish a communication session with a service provider after the user has selected help option 311.

The enhanced routing system 101 authenticates 402 the client device. For example, the authenticator 120 generates an authentication code for the client device and authenticates or verifies the client device responsive to receiving the generated code from the client device.

The enhanced routing system 101 determines 403 whether a user identity has been verified. In some embodiments, authenticator 101 is unable to verify the client device or user identity associated with the client device. An unsuccessful verification includes attempts by an imposter to establish a communication session, incorrect attempts by the true user, requests by an unknown user (e.g., the enhanced routing system 101 does not have a record of the phone number contacting it and cannot verify the identity), and failures caused by technical issues (e.g., an Internet connection between the enhanced routing system 101 and a client device does not support the transmission of the authentication code). Code verifier 121 of the enhanced routing system 101 may determine, based on the received code from a client device, whether to verify a user identity. If the enhanced routing system 101 determines that a user identity has been verified, the process 400 proceeds to determining 405 the activity history of the client device. If the enhanced routing system 101 determines that a user identity has not been verified, the process 400 process to requesting 404 an alternative authentication.

The enhanced routing system 101 requests 404 alternative authentication. In some embodiments, additional security measure may be used to authenticate a client device. For example, if the code was entered incorrectly, the enhanced routing system 101 may prompt the client device for answers to security questions that the true user would know the answer to. In some embodiments, a client device requesting a communication session is not recognized by the enhanced routing system 101. For example, the enhanced routing system 101 does not recognize a phone number or IP address from which the client device is using to contact the enhanced routing system 101 over a network. In response to being unable to recognize a client device (e.g., the phone number is an unknown number), the enhanced routing system 101 may request an alternative form of identification to authenticate the client device. For example, the enhanced routing system 101 may request an email address or name associated with a user of the client device. After requesting 404, the process 400 returns to authenticate 402 the client device. For example, the authenticator 120 may determine, based on the responses to the security questions posed, that the client device is authenticated. If an alternative form of identification was provided to the enhanced routing system 101 to authenticate the client device, the enhanced routing system 101 may provide an authentication code using the alternative form of identification (e.g., email the authentication code to the email address provided as identification).

The enhanced routing system 101 determines 405 activity history of the client device. For example, the enhanced routing system 101 retrieves records of activity history as described in the description of FIG. 2 and identifies the records that have been created within a threshold time period from the current time. As depicted in FIG. 3, the enhanced routing system 101 may determine that the user has selected "Accounts Payable" in the GUI 320 within the last ten minutes, indicating that a user has recently been interacting with or wants to interact with a service provider dealing with accounts payable.

The enhanced routing system 101 identifies 406 a user profile associated with the user. In some embodiments, the enhanced routing system 101 retrieves a user profile from the personnel database 160.

The enhanced routing system 101 selects 407 a service provider. The machine learning model 230 may select, based on the determined activity history and identified user profile, a service provider that is most likely to best service a user. For example, based on the activity history indicating that a user is interested in accounts payable and user profile information indicating that the user's title at the business is Chief Financial Officer, the machine learning model 230 selects an accounting service provider that is most likely to best serve the user.

The enhanced routing system 101 establishes 408 a communication session between the client device and the service provider to fulfill the request. For example, after determining that the accounting service provider is most likely to best serve the user, the enhanced routing system 101 initiates an instant messaging session between the client device of the user and a device of the accounting service provider.

Figure 5:
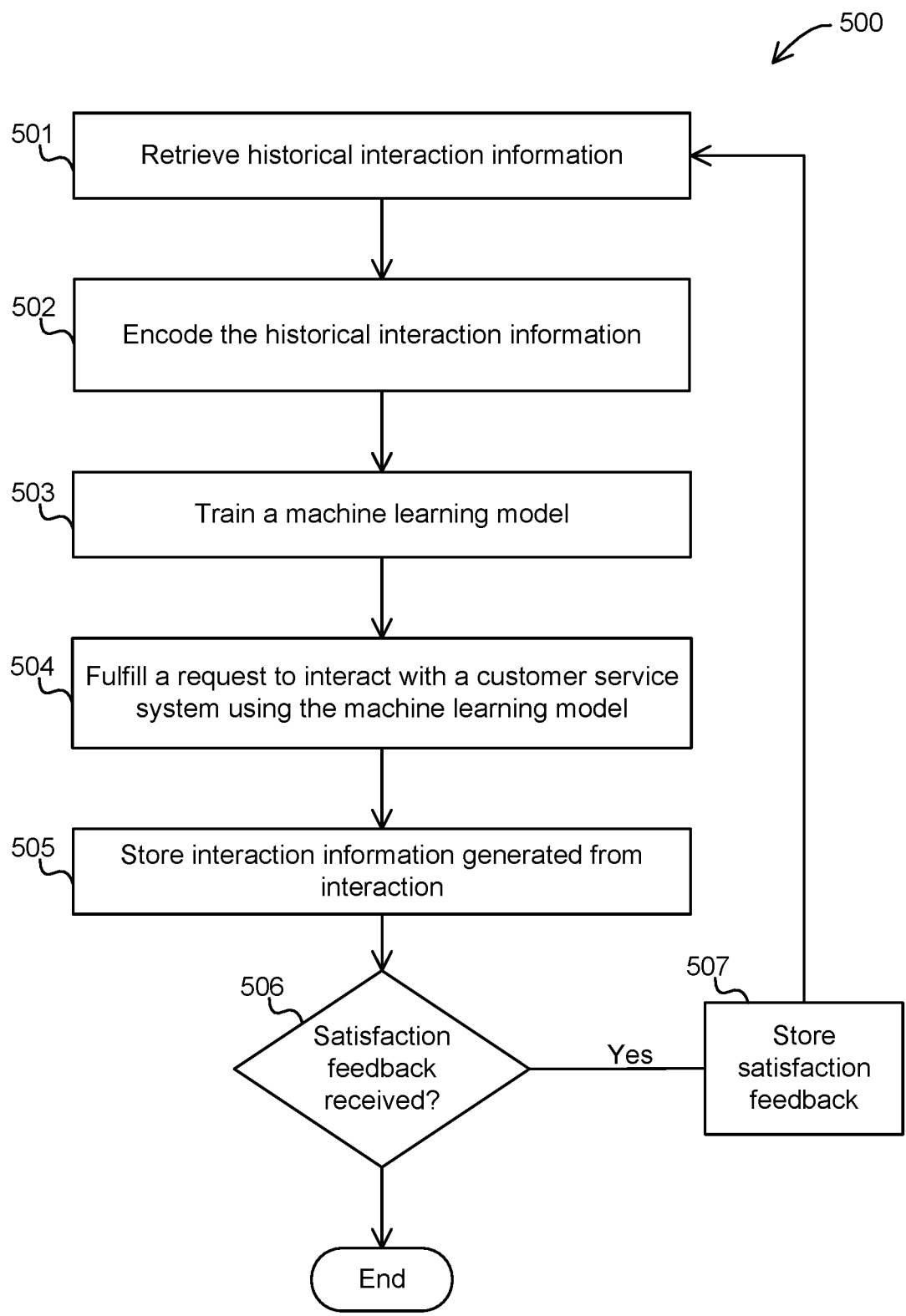
FIG. 5 is a flowchart illustrating a process for training a machine learning model of the enhanced routing system, in accordance with at least one embodiment.

FIG. 5 is a flowchart illustrating a process 500 for training a machine learning model of the enhanced routing system. The machine learning model may be trained to improve the likelihood that an established communication session is successful. The process 500 may be performed by the enhanced routing system 101.

The enhanced routing system 101 retrieves 501 historical interaction information. In some embodiments, the data curator 210 retrieves information about communication sessions that have previously occurred between the client device (and/or user associated with the client device) and devices of respective service providers. For example, the data curator 210 retrieves records indicating participants in communication sessions, durations of the communication sessions, and feedback information received regarding the communication sessions.

The enhanced routing system 101 encodes 502 the historical interaction information. For example, the encoder 220 encodes feedback information about the degrees of success at which communication sessions were established into quantifiable representations of the information (e.g., feature vectors).

The enhanced routing system 101 trains 503 a machine learning model. In some embodiments, the enhanced routing system 101 trains the machine learning model 230 using training sets that include encoded historical interaction information. For example, the enhanced routing system 101 trains the machine learning model 230 using training sets representative of successful interactions (e.g., feedback information indicates 100% satisfaction) and unsuccessful interactions (e.g., feedback information indicates 0% satisfaction).

The enhanced routing system 101 fulfills 504 a request to interact with a customer service system (e.g., establishes a communication session between a client device and a device of a service provider) using the machine learning model. For example, using the service provider selected by the machine learning model 230, the enhanced routing system 101 initiates a phone call over IP between a client device and a device of a service provider.

The enhanced routing system 101 stores 505 interaction information generated from the interaction. In some embodiments, interaction information includes the participants of the communication session established upon fulfillment 504 and duration of the communication session established.

The enhanced routing system 101 determines 506 whether satisfaction feedback has been received. For example, after the communication session established by the enhanced routing system 101 has terminated, the enhanced routing system 101 may receive feedback from the user (e.g., through the GUI 350). The enhanced routing system 101 may determine whether a user has provided a rating of the communication session (e.g., through the rating menu 351) or provided implicit feedback (e.g., by selecting an alternative service provider through the supplemental service menu 352). If the enhanced routing system 101 determines that satisfaction feedback has been received, the process 500 proceeds to storing 507 satisfaction feedback. If the enhanced routing system 101 determines that satisfaction feedback has not been received, the process 500 terminates.

The enhanced routing system 101 stores 507 satisfaction feedback regarding communication sessions requests that have been fulfilled. After storing satisfaction feedback, the process 500 may return to retrieving 501 historical interaction information, which includes stored satisfaction feedback. In some embodiments, the enhanced routing system 101 may use stored satisfaction feedback to further train the machine learning model 230. The satisfaction feedback may be accessed by the data curator 210 (e.g., the retrieval 501) to be encoded (e.g., the encoding 502) for retraining the machine learning model (e.g., the training 503).

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving, from a client device of a user, a request to interact with a communications system;
    selecting an entity within the communications system by applying a machine-learned model configured to a feature vector generated based on historic activity of the user, the machine-learned model configured to identify an entity of a plurality of entities of the communications system based at least in part on both a most recently viewed page associated with the communications system and a job title of the user; and
    establishing a communication session between at least the client device and a device of the selected entity to fulfill the request to interact.

2. The method of claim 1, further comprising receiving an identification number associated with the client device.

3. The method of claim 2, wherein the identification number associated with the client device is at least one of a phone number, media access control (MAC) address, or internet protocol (IP) address.

4. The method of claim 2, further comprising authenticating the client device comprises in response to determining that the identification number of the client device is a pre-approved number.

5. The method of claim 1, wherein the historic activity of the user is associated with a user profile associated with the user, wherein the user profile is identified by:
    accessing a personnel database comprising a plurality of user profiles; and
    matching a phone number associated with the client device to a phone number associated with the user profile of the plurality of user profiles.

6. The method of claim 5, wherein the user profile comprises at least one of a location of the user, information describing a relationship between the user and the communication system, the job title of the user, or satisfaction information authored by the user.

7. The method of claim 1, wherein the historic activity of the user is determined by:
    receiving activity history of the client device occurring within a time interval immediately preceding the request to interact with the communications system.

8. The method of claim 1, wherein the historic activity of the user comprises at least one of applications executed by the client device, user actions occurring within an application executed by the client device, application or web pages viewed by the client device, and text entered into an input interface on the client device.

9. The method of claim 1, wherein the request to interact with the communications system comprises a voice call from the client device.

10. The method of claim 1, wherein the machine learning model is trained on data representative of previous interactions with the communications system by other users and user profiles and activity histories associated with the other users.

11. The method of claim 1, wherein the entity is selected based at least in part on a dot product between the feature vector and a vector representative of characteristics of the entity.

12. The method of claim 1, further comprising receiving a measure of satisfaction from the client device representative of the selected entity and re-training the machine learning model based at least in part on the received measure of satisfaction.

13. The method of claim 12, wherein re-training the machine learning model comprises strengthening an association between the selected entity and characteristics of the user or historic activity of the user in response to the measure of satisfaction being a positive measure of satisfaction, and weakening the association between the selected entity and characteristics of the user or historic activity of the user in response to the measure of satisfaction being a negative measure of satisfaction.

14. The method of claim 12, further comprising generating a data structure mapping the measure of satisfaction and information characterizing the communication session.

15. The method of claim 14, wherein information characterizing the communication session comprises at least one of a list of participants in the communication session, a duration of the communication session, or a time at which the communication occurred.

16. The method of claim 14, wherein re-training the machine learning model based at least in part on the received measure of satisfaction comprises re-training the machine learning model using the data structure.

17. The method of claim 13, wherein the measure of satisfaction comprises a user selection of a different entity.

18. The method of claim 1, wherein establishing the communication session between at least the client device and the device of the selected entity comprises initiating a phone or voice over IP call between the client device and the device of the selected entity.

19. A routing system configured to perform steps comprising:
  receiving, from a client device of a user, a request to interact with a communications system;
  selecting an entity within the communications system by applying a machine-learned model configured to a feature vector generated based on historic activity of the user, the machine-learned model configured to identify an entity of a plurality of entities of the communications system based at least in part on both a most recently viewed page associated with the communications system and a job title of the user; and
  establishing a communication session between at least the client device and a device of the selected entity to fulfill the request to interact.

20. A non-transitory computer readable storage medium storing executable instructions that, when executed by one or more processors, cause the one or more processors to perform steps comprising:
  receiving, from a client device of a user, a request to interact with a communications system;
  selecting an entity within the communications system by applying a machine-learned model configured to a feature vector generated based on historic activity of the user, the machine-learned model configured to identify an entity of a plurality of entities of the communications system based at least in part on both a most recently viewed page associated with the communications system and a job title of the user; and
  establishing a communication session between at least the client device and a device of the selected entity to fulfill the request to interact.

* * * * *